United States Patent [19]

Linford et al.

[11] Patent Number: 4,794,345
[45] Date of Patent: Dec. 27, 1988

[54] PHASED ARRAY COMBINATION OF LASER BEAMS

[75] Inventors: Gary J. Linford, Torrance; Robert Aprahamian, Hermosa Beach; Leonard J. Marabella, Torrance; Jesper Munch, Playa Del Rey; Richard H. Moyer, Rolling Hills Estates; Gabriel G. Lombardi, Redondo Beach, all of Calif.

[73] Assignee: TRW Inc., Redondo Beach, Calif.

[21] Appl. No.: 832,950

[22] Filed: Feb. 26, 1986

[51] Int. Cl.$^4$ .......................... H01S 3/23; H01S 3/30; H01S 3/098
[52] U.S. Cl. .......................... 330/4.3; 372/18
[58] Field of Search .......................... 330/4.3; 332/7.51; 307/426; 372/18, 21, 27, 32, 33, 98, 106

[56] References Cited

U.S. PATENT DOCUMENTS

| | | | |
|---|---|---|---|
| 3,727,223 | 4/1973 | O'Meara | 332/7.51 |
| 3,763,441 | 10/1973 | Roess | 372/97 |
| 3,794,929 | 2/1974 | Carr | 372/97 |
| 4,060,769 | 11/1977 | Mallozzi et al. | 330/4.3 |
| 4,215,936 | 8/1980 | Winocur | 307/426 |
| 4,220,928 | 9/1980 | Bloom et al. | 372/33 |
| 4,264,869 | 4/1981 | Hunter | 330/4.3 |
| 4,344,042 | 8/1982 | Ham | 372/21 |
| 4,648,092 | 3/1987 | Ewbank et al. | 372/98 |
| 4,682,340 | 7/1987 | Dave et al. | 372/93 |

OTHER PUBLICATIONS

Lam et al., "Locking of Diode Gain . . . Techniques", 3/84, pp. 1–86, NTIS AD-A141.
Liberman, I., "Application of Phase Conjugation . . . Lasers", 1979, pp. 426–429, SPIE, vol. 190, LASL Opt. Conf.
Shellan, J., "Phased-Array . . . Polerization Errors", pp. 555–566, J. Opt. Soc. Am. A, vol. 2, #4.
Siegman, A. B. "Developments in Mode- . . . Applications", 1982, pp. 60–67, SPIE, V322, NTIS AD-A117.

*Primary Examiner*—Nelson Moskowitz
*Attorney, Agent, or Firm*—Noel F. Heal; Sol L. Goldstein

[57] ABSTRACT

Apparatus, and a corresponding method for its use, for producing a phased array of high-energy laser beams from multiple laser amplifiers. A reference beam produced by a master oscillator senses phase and piston errors in a primary mirror array, and is divided into multiple probe beams, each of which makes multiple passes of its own laser amplifier. The multiple probe beams are together focused into a single phase conjugation cell, which not only produces phase-conjugated reflected beams, to effect compensation for various phase aberrations, but also locks all of the reflected beams together in phase. An arrangement of a birefringent wedge and a quaterwave plate for each of the beams prevents the reflected beams from returning to the master oscillator and facilitates combining of the reflected beams for output as a cophasal array. In a preferred embodiment of the invention, this is accomplished by using the birefringent wedges to deflect each retro-reflected phase-conjugated beam onto the appropriate portion of a monolithic secondary mirror, and then to the primary mirror array.

16 Claims, 7 Drawing Sheets

PHASED ARRAY COMBINATION OF LASER BEAMS

BACKGROUND OF THE INVENTION

This invention relates generally to high-energy lasers, and more particularly, to a novel solution to a problem posed by the need for a ground-based or space-based high-energy laser source of large effective aperture and power. The physics of monolithic high-energy lasers, such as excimer lasers, impose inherent limitations that preclude their operation at apertures greater than some level limited by considerations such as pump dimensions, the presence of parasites, optical element sizes, media uniformity, and so forth. For excimer lasers, energy levels greater than a fraction of one megajoule (MJ) in a pulsed mode of operation are difficult to achieve.

For lasers to be effectively used as defensive weapons, much higher energy levels are needed, and recent design efforts in this field have, therefore, focused on systems that employ arrays of lasers producing a single composite beam of very high energy. If an array of N beams, each of the same energy level, is appropriately focused onto a target, the energy intensity at the target will be in the order of N times the intensity resulting from just one of the beams. This assumes that the energy of the beams adds incoherently, i.e. that the separate beams are not in phase with each other. However, if the beams can be combined coherently, i.e. practically perfectly matched in frequency and phase, the energy intensity at the target will be approximately $N_2$ times the intensity of a single beam. For an array of one hundred lasers, for example, there is a potential for increasing the target intensity by a factor of one hundred if the separate beams can be combined coherently rather than incoherently.

The concept of combining separate radiation beams coherently in phased arrays is well known in radio communications, but has been more difficult to put into practice for optical radiation. The difficulty, of course, stems from the difference in wavelengths between radio and optical waves. Even for radio transmissions at 1 GHz (gigahertz) and above, the wavelengths are measured in terms of centimeters or millimeters, and the construction of a phased array having mechanical tolerances of one twentieth of a wavelength are attainable without great difficulty. For optical radiation, however, the tolerances are very stringent. Light of wavelength 248 nm (nanometers), for example, requires tolerances of around $1.2 \times 10^{-6}$ cm to achieve phase coherence to within one twentieth of a wavelength. Separate laser beams emanating from separate laser amplifiers are subject to separate sets of phase-aberrating conditions in the amplifiers and in the associated optical elements for each beam path. The resulting differences in phase arise not only from differences in construction and geometrical relationships, but also from factors that may vary with time. For example, optical components may be subject to mechanical "jitter" that causes phase and pointing changes, and the laser gain region within each amplifier may also change significantly with time.

Prior to this invention, optical phased-array technology has utilized principles of adaptive optics to achieve some degree of phase coherence. Basically, this approach employs one or more deformable mirrors, which are large reflecting surfaces made up of separately movable elements, each driven by a transducer, such as a piezoelectric device. The character of the optical wavefront emanating from such a mirror has to be sensed with a complex and highly sensitive interferometer, and then the composite wavefront has to be converted to electrical form, stored in an electronic memory, and manipulated mathematically to determine the magnitude of elemental corrections that have to be made in the deformable mirror.

The adaptive optics approach is inherently slow, because of its reliance on mechanical elements to effect phase compensation. The approach is also subject to errors due to intermirror optical path length differences, called "piston errors." Compensation of these errors has required the use of very complex arrangements of interferometry and adaptive optical components. The approach becomes even less practical as the size of the desired beam aperture increases. For large apertures, in the order of ten meters in diameter, deformable mirrors having as many as 10,000 elements may be required. Since each element is of finite size, the array has limited resolution and ability to correct wavefront distortions. Moreover, the cost and reliability of deformable mirrors of this magnitude have posed serious limitations to the development of a practical phased array system using adaptive optics.

By way of further background, the invention also relates to the field of phase conjugate optics. It has been recognized for some time that phase conjugation of light waves can be used to remove phase aberrations caused by the passage of a light beam through a distorting or phase-aberrating medium.

There is extensive literature on the subject of phase conjugate optics and the use of phase conjunction for the compensation of phase aberrations. A summary of the history and principles of phase conjugate optics is provided in a paper entitled "Phase Conjugate Optics and Real-Time Holography," by Amnon Yariv, IEEE Journal of Quantum Electronics, Vol. QE-14, No. 9, September, 1978, pp. 650–60.

Simply stated, a phase conjugation cell functions as a reflector with a special and useful property. When an incident light wave is focused into the cell, the reflected wave that emerges is the complex conjugate of the incident wave. The practical consequence of the phase conjugation is that the retro-reflected wave is as if it were "time-reversed" with respect to the incident wave. For example, if an incident wave, after passing through a distorting medium, has a bulge in its wavefront, representing a phase-lagging condition at a particular region of the front, this will be reflected as an opposite bulge, i.e. a phase lead, in the same region of the reflected wavefront. If the reflected wavefront then traverses the same distorting medium that caused the original bulge in the incident wavefront, the reflected wave will emerge from the distorting medium as an undistorted wave.

In spite of the existence of a large body of theoretical knowledge concerning the principles of phase conjugate optics, prior to the present invention these principles have not been applied to the problem with which the invention is concerned. It will be appreciated from the foregoing that there is still a critical need for an alternative approach to the construction of phased arrays of high-energy lasers. What is needed is a technique for coupling the outputs of multiple laser amplifiers together in frequency and phase, while at the same time eliminating "piston errors" between adjacent beams, and compensating for other sources of phase aberration in each beam path, at high resolution. The present invention provides a reliable and elegant solution to all of these problems, as will become apparent from the following summary of the inventive features.

SUMMARY OF THE INVENTION

The present invention resides in a practical application of the principles of phase conjugation to the production of coherent multiple laser beams, and to the virtual elimination of phase aberrations in the optical paths of the separate beams. Briefly, and in general terms, the apparatus of the invention comprises a master laser oscillator for producing a reference laser beam that is coherent and diffraction limited, optical means for dividing the reference beam into a plurality of probe beams, and an equal plurality of laser amplifiers positioned to receive the respective probe beams. Each laser amplifier includes a laser gain region and optical means to provide multiple passes through the gain region, to generate near saturation flux in the probe beams. The apparatus also includes a single phase conjugation cell, and means for focusing the amplified probe beams into the phase conjugation cell. Each conjugated probe beam is reflected from the phase conjugation cell along a substantially identical path to that of the probe beam. The apparatus further includes discrimination means associated with each of the probe beams, for discriminating between the probe beam and the corresponding reflected beam. The reflected beams emerging from the laser amplifiers are phase coherent with each other and are free of aberrations resulting from passage through the laser amplifiers and their associated components.

The discrimination means in the illustrative embodiment of the invention includes, for each probe beam, a polarization-sensitive wedge and a quarter-wave plate, both disposed in the path of the probe beam. The polarization-sensitive wedge deflects the probe beam through a predetermined angle, which depends on the direction of polarization of the probe beam. The quarter-wave plate converts linear polarization of the probe beam to circular polarization. On the return pass through the discrimination means, the quarter-wave plate converts the polarization from circular to linear, but the two passes through the plate has the effect of rotating the direction of polarization by ninety degrees. The polarizationsensitive wedge therefore deflects the reflected beam through a different angle from the deflection angle for the probe beam. The optical means employed to launch each probe beam into its laser amplifier are positioned to avoid receiving the reflected beam, which will traverse a slightly different path from that of the probe beam. The multiple return beams can, therefore, be collected and combined for transmission as a single composite beam.

The focusing of all of the probe beams into the single phase conjugation cell with overlapping focal volumes results in the reflected beams being phase coherent with each other. The phase conjugation effect of the cell ensures that phase aberrations in each probe beam path will be effectively cancelled during the return pass. The types of aberrations cancelled by the phase conjugation effect include those due to lack of homogeneity in the laser gain regions, and those arising from "piston errors" between the path lengths, misalignment in the phased array, and even mechanical jitter of the optical elements.

In terms of a novel method, the present invention includes the steps of generating a coherent reference beam in a master oscillator, dividing the reference beam into a plurality of probe beams, sensing the optical inhomogeneities in the optical train, inputting each probe beam into its own laser amplifier, reflecting each probe beam repeatedly through a laser gain region within its amplifier, and then focusing all of the probe beams into a single phase conjugation cell in which the focal volumes partially overlap. The remaining steps of the method are: generating phase coherent, phase-conjugated retroreflected beams in the phase conjugation cell, reflecting the retro-reflected beams from the same mirrors passing the reflected beams over substantially the same paths as the probe beams, to eliminate phase distortions, and discriminating between the input probe beams and the reflected beam, to couple the reflected beams out of the apparatus as a composite phase-coherent beam.

In the preferred form of the method, the discriminating step includes deflecting both the probe beam and the reflected beam by an amount that depends on the direction of polarization. This is accomplished by passing the probe beam through a birefringent wedge to deflect it through a predetermined angle, then through a quarter-wave plate to change its polarization. On the return pass, the reflected beam passes through the quarter-wave plate again and has its direction of polarization changed by ninety degrees as a result of the two passes. Consequently, the birefringent wedge deflects the reflected beam through a different angle and the reflected beam emerges from the amplifier at an angle different from the incident angle of the probe beam, and the reflected beam thereby avoids contact with the optical elements employed to inject the probe beam into the amplifier. By this means, the reflected beams can be separated from the probe beams, and collected for output.

In a disclosed practical embodiment of the invention, the apparatus includes a master laser oscillator for generating a coherent reference beam, a primary mirror array disposed to synthesize a single curved surface, an expanding lens system disposed, for example, near the center of curvature of the primary mirror array, means for coupling the reference beam into the expanding lens system, to produce a diverging beam with a spherical wavefront, and a collimating mirror disposed on the axis of the primary mirror array, to collect sub-beams of light reflected from the primary mirror array and produce a collimated bundle of probe beams. The apparatus also includes a secondary mirror disposed on the same axis as the primary mirror array and having a central aperture to permit passage of the collimated bundle of input probe beams, and a beam dividing assembly disposed behind the primary mirror array and in the path of the collimated bundle of probe beams, which pass through an aperture in the primary array. The apparatus also includes input mirror means, for injecting each probe beam into a separate laser amplifier, each of which has a laser gain region and a pair of mirrors for producing multiple passes of the probe beam through the gain region. Each probe beam, on emerging from its amplifier, is subject to deflection by an input/output beam discrimination device, and is focused into a single phase conjugating cell, with overlapping focal volumes, which, upon being phase- conjugated reflects each probe beam in phase conjugate form and in a phase-coherent relationship with the other reflected beams.

Each phase-conjugated reflected beam passes through its amplifier again, in the reverse direction, to cancel its phase distortion components, and is subject to beam separation because of the action of the input/output beam discrimination device. Consequently, the reflected beams emerging from the amplifiers do so along paths that may differ slightly from the input paths of the probe beams. These reflected beam paths are incident on the secondary mirror, which further expands the beams to impinge on the primary mirror array, and thence be reflected out from the system as a coherent beam with a very large aperture.

It will be appreciated from the foregoing that the present invention represents a significant advance in the field of phased arrays of high-energy lasers. In particular, the invention eliminates phase aberrations from multiple sub-beams used as outputs from multiple-laser sources, and ensures that the sub-beams are coherent with each other. Other aspects and advantages of the present invention will become apparent from the following more detailed description, taken in conjunction with the accompanying drawings.

DESCRIPTION OF THE PREFERRED EMBODIMENTS

As shown in the drawings for purposes of illustration, the present invention is concerned with phased arrays of high-energy lasers. Although it is known that higher target intensities can be obtained from an array of lasers if the lasers are tightly coupled together in frequency and phase, prior to this invention there has been no practical technique for achieving such phase locking among multiple high-energy lasers. The use of adaptive optics techniques has not proved satisfactory because of its inaccuracy, slow speed, relatively high cost, and limited resolution.

In accordance with the invention, multiple laser beams are coupled together in a phase coherent relationship by focusing each of the beams into a single phase conjugation cell, with overlapping focal volumes, and then combining the separate reflected beams. To understand how the invention achieves this phase coherency, one must first have some understanding of the principle of optical phase conjugation.

Figure 3A:
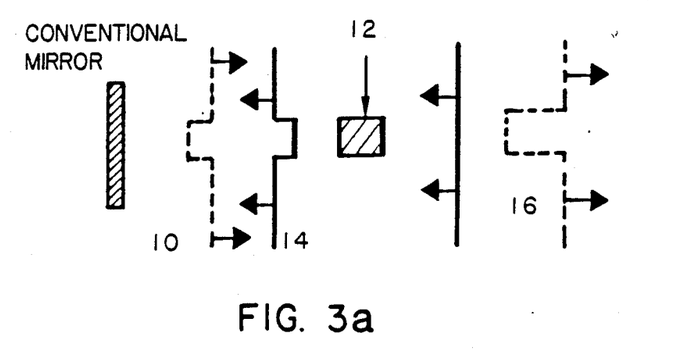
FIGS. 3a and 3b are schematic views illustrating the principle of phase aberration cancellation by optical phase conjugation.

Although there is a rigorous mathematical explanation of phase conjugation, an intuitive understanding of the principle can be obtained without using a mathematical description of the light waves involved. A perfect planar or spherical wavefront can be distorted by many different factors, such as imperfect optical elements, or a distorting propagation medium. Any source of phase distortion can produce a wavefront that is no longer perfectly planar or spherical. For example, the wavefront indicated by reference numeral 10 in FIG. 3 has been distorted by a distorting medium 12, such that one region of the wavefront lags in phase behind the remainder of the wavefront. If this distorted wavefront were to be reflected from a conventional mirror, as shown in FIG. 3a, the reflected wavefront would still exhibit a phase-lagging bulge in one region. Since the reflected wavefront is traveling in the opposite direction to the incident wavefront, the "bulge" of the distortion appears on the opposite side of the wavefront, as indicated at 14. As the reflected wavefront traverses the distorting medium, the lagging bulge in the wavefront is distorted even further, as indicated at 16.

Figure 3B:
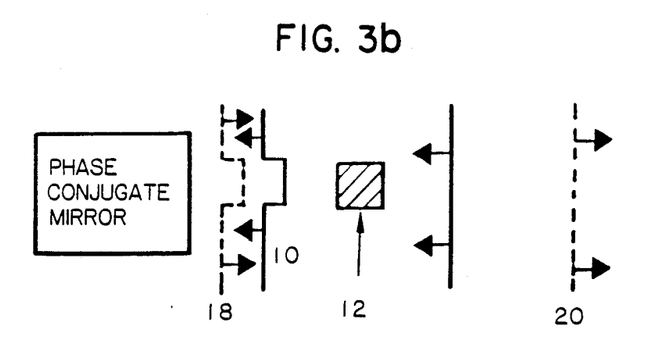

One important consequence of phase conjugation is that it results in reflection in a "time reversal" manner. What is meant by this is that a phase-lagging portion of the incident wavefront will reflect as a phase-leading portion of the reflected wavefront. The reflected wavefront then appears as an exact duplicate of the incident wavefront, but it is traveling in the opposite direction, as indicated at 18. After passing through the distorting medium again, the reflected wave 20 is exactly phase-corrected. In effect, the first pass through the distorting medium probes or measures the medium for phase-aberrating conditions, and these are recorded on the wavefront of the incident light beam. As a result of the action of the phase conjugation cell, the recorded aberrations are changed in such a manner as to automatically compensate for them on the return pass through the distorting medium.

Phase conjugation can be accomplished using any of a number of alternative techniques, among them being stimulated Brillouin scattering (SBS) and four-wave-mixing (FWM). These are explained in more detail in the Yariv paper cited in the background section of this specification. The particular technique employed for phase conjugation is not critical to the invention, as will become apparent as the description proceeds.

Figure 1:
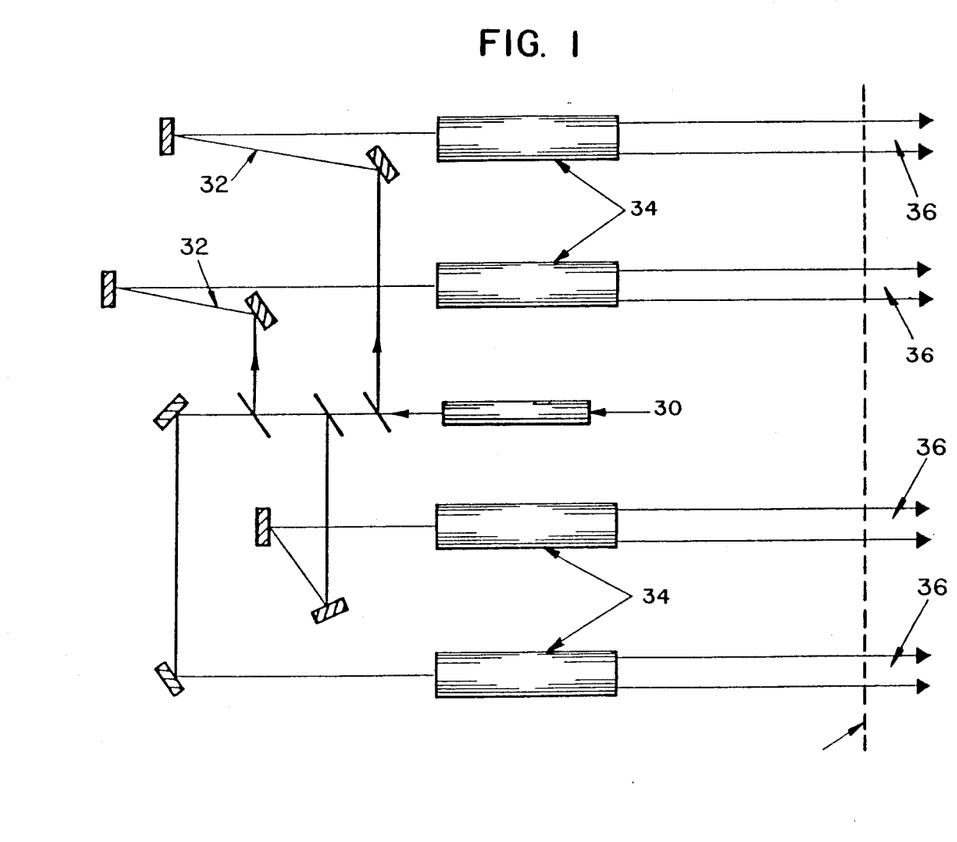
FIG. 1 is a schematic view of a phased array laser system employing a master oscillator power amplifier (MOPA) configuration.

As shown in FIG. 1, the configuration usually employed in phased arrays of lasers is the socalled master oscillator power amplifier (MOPA) configuration. A master laser 30 oscillator is employed to generate a reference beam, which is divided into sub-beams in beam-splitting and optical delay lines, indicated generally at 32. The sub-beams are injected into separate multi-pass laser power amplifiers 34, the output beams from which are combined, as indicated at 36. To achieve phase coherency between the output beams has proved to be extremely difficult. Adjusting the path lengths of the sub-beams for phase coherency is a complex matter, even if wavefront sensors and deformable mirrors are used.

Figure 2:
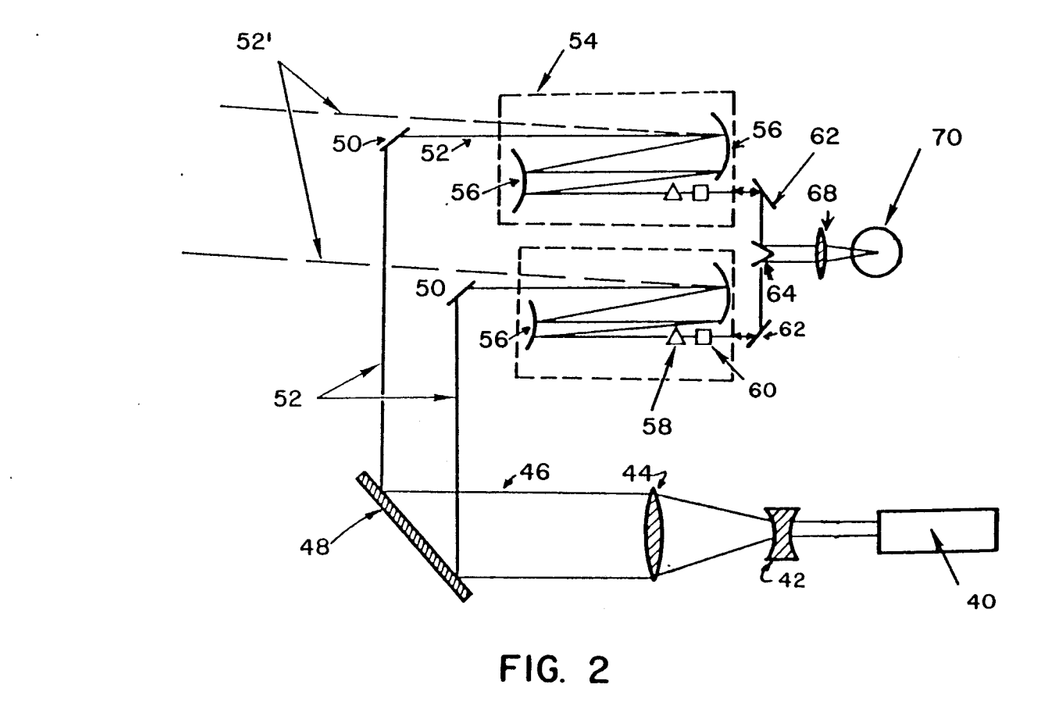
FIG. 2 is a schematic view of a system employing multiple lasers amplifiers in accordance with the principles of the present invention.

The principle of the master oscillator power amplifier configuration is still employed in the present invention, as shown in FIG. 2, but with the important difference that phase conjugation is used to achieve phase coherency between the sub-beams. A master oscillator 40 generates a coherent reference beam that is diffraction limited and of relatively low power. The reference beam passes through a negative lens 42 and a collimating lens 44, to produce an enlarged reference beam, as indicated at 46. The enlarged reference beam 46 is then reflected from a plane mirror 48, after which it impinges on multiple input mirrors 50, only two of which are shown in FIG. 2. The input mirrors produce separate beams, referred to as the probe beams, which follow optical paths 52 into separate laser power amplifiers 54, only two of which are shown.

Each laser power amplifier 54 has a pair of opposed curved mirrors 56 and includes a laser gain region (not shown) between the mirrors. Each entering beam 52 makes multiple passes through the gain region, the number of passes depending on the geometry of the curved mirrors 56, and being selected to provide practically complete saturation flux in the finally emerging beams. After the final pass through its amplifier 54, each probe beam passes through a birefringent wedge 58, which is sensitive to the direction of linear polarization of the beam passing through it. Specifically, the wedge 58 deflects the beam through a small angle, the magnitude of which depends on the polarization. After passing through the wedge 58, the probe beam passes through a quarter-wave plate 60, which has the effect of converting the polarization of the beam from linear to circular.

Each probe beam then impinges on another plane mirror 62, which deflects the beam toward another plane mirror 64. The mirrors 64 are grouped together to provide a beam combining function, such that the separate probe beams are gathered into a parallel bundle, indicated at 66, then brought to a focus, with overlapping focal volumes, by a positive lens 68 in a single phase conjugating cell 70. This may be a stimulated-Brillouin-scattering (SBS) cell or a four-wave-mixing (FWM) cell. For purposes of this description, it will be referred to only as a phase conjugation cell. Its effect is to produce for each incident beam a reflected beam that is the phase conjugate of the incident beam. As previously suggested, the phase conjugated beam may be thought of as "time reversed." As explained with reference to FIGS. 3a and 3b, the reflected wave will have its phase distortions removed on the return pass from the phase conjugation cell 70.

The inventors have discovered an additional important property of phase conjugation cells used in the configuration described. If the multiple probe beams are focused into the phase conjugation cell in such a manner that their focal volumes overlap, the resultant reflected beams will be phase locked, as well as phase conjugated.

The reflected beams retrace the paths of the respective probe beams, but with one important exception. On encountering the quarter-wave plate 60, the circularly polarized reflected beam will be converted to linear polarization of the opposite type to that of the probe beam before it first encountered the quarter-wave plate. In other words, the two passes through the quarter-wave plate 60 result in the direction of linear polarization being rotated by ninety degrees. As a result, the reflected beam is deflected through a slightly different angle by the birefringent wedge 58, and the reflected beam eventually emerges from the amplifier 54 along a path 52' that diverges from the input path 52, and completely misses the input mirror 50. In this manner, the reflected beams are distinguished from the probe beams and may be collected together for output as a single coherent beam.

The reflected beams, being phase conjugates of the probe beams, and following practically the same path through the amplifiers 54, emerge along the paths 52' almost completely free of aberrations caused by variations among the amplifiers and their associated optical components. The aberrations may result from imperfections in any of the optical elements, lack of homogeneity in the amplifiers, lack of alignment, beam jitter, or intermirror "piston errors." Regardless of the source of the aberration, the phase conjugation technique not only compensates for it, but ensures that all of the reflected beams are phase coherent with each other.

The only errors not compensated for by phase conjugation are those arising from imperfections in the reference beam components, specifically, the lenses 42 and 44, and the mirrors 48 and 50. This is because the input mirrors 5D, and all optical components encountered by the reference beam prior to the input mirrors, are not included in the paths of the beams reflected from the phase conjugation cell 70, and are therefore not subject to phase error correction by the conjugation process. Two approaches are possible for minimizing the effect of these remaining possible errors. First, the components can be made and aligned as precisely as possible. Second, one of the components, such as the mirror 48 can be fabricated as a deformable mirror. This does not render the invention subject to the disadvantages of adaptive optic systems, however. Unlike the aberrations introduced in the amplifiers 54, aberrations introduced by the reference beam optical components are constant in nature, and can be compensated by a single setting of a deformable mirror. Stated another way, the aberrations introduced in the reference beam components do not, in general, require continuous or "real-time" compensation. The errors can be measured, then compensated for in the deformable mirror.

Figure 4:
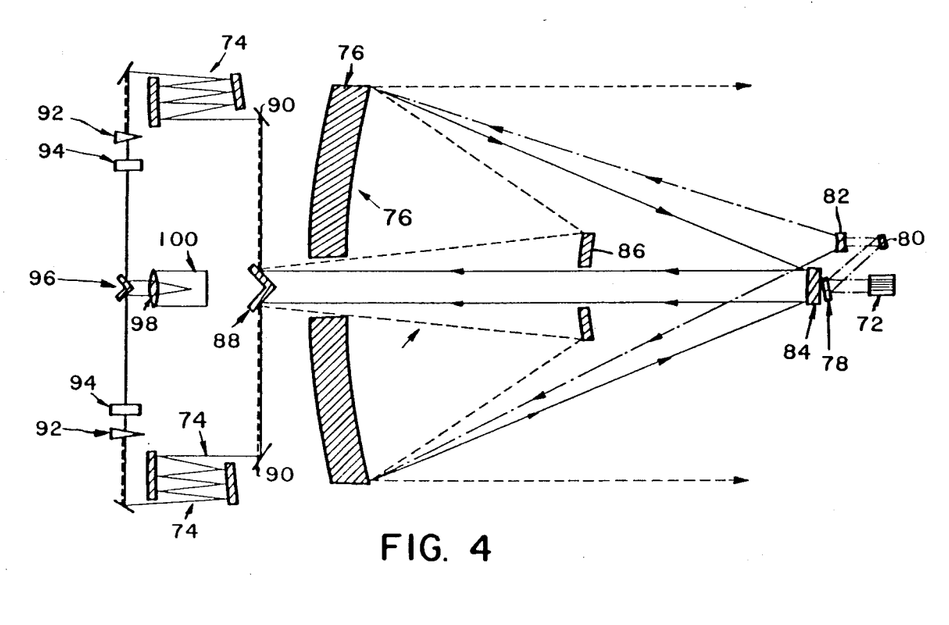
FIG. 4 is a schematic view of a phased array of laser energy sources employing the principle of the invention.

FIG. 4 shows a phased array of lasers in a more practical configuration than that of FIG. 2, which was more useful for purposes of explanation. In the FIG. 4 configuration, there is also a master oscillator 72 and a plurality of laser power amplifiers 74. There is also a primary mirror array 76, which is an array of N separate mirrors arranged on a curved surface. The reference beam from the master oscillator 72 is reflected by alignment mirrors 78 and 80 into an expanding lens (or mirror) 82 located approximately at the center of curvature of the primary mirror array 76. The reference beam is expanded by the lens (or mirror) 82 into a diverging beam with a spherical wavefront. The diverging beam impinges on the primary mirror array 76, and is reflected back toward the center of curvature of the array, where the reflected beams impinge on a collimating mirror 84. The separate beams are collimated into a cylindrical bundle of beams and are transmitted toward a central opening in the primary array 76. A secondary mirror 86 is located on the same axis as the primary array, between the collimating mirror 84 and the primary array 76. The secondary mirror presents a convex reflecting surface toward the primary array 76 and also has a central opening to permit passage of the collimated array of probe beams.

After passing through the primary array 76, the collimated probe beams encounter a beam dividing mirror 88, which deflects the separate beams in different directions, each toward its own amplifier input mirror 90. The input mirror 90 injects the probe beam into its amplifier 74, which functions in the same manner as the amplifiers 54 in FIG. 2. When the probe beam emerges from the amplifier 74 it passes through a polarization sensitive wedge 92 and a quarter-wave plate 94, and proceeds to a beam combiner 96, which recombines the probe beams into a single cylinder once more. A lens 98 then focuses the probe beams into a single phase conjugation cell 100. Phase-conjugated reflection takes place, and the separate beams are also rendered phase coherent in the cell 100. The reflected beams retrace the paths of the probe beams through the amplifiers, except that the wedge 92 and plate 94 operate to change the direction of the reflected paths slightly. This results in the reflected beams following a more divergent path from the beam dividing mirror. The phase-coherent and error-corrected beams now impinge on the secondary mirror 86, and are reflected onto the primary mirror array 76. The beams finally emerge from the primary mirror array of the apparatus as a set of phase-coherent beams of high energy and large total aperture.

Care is taken to equalize the path lengths for the separate probe beams to within a fraction of a coherence length, which is typically measured in centimeters. The secondary mirror 86 is monolithic in structure, and is clearly one of the elements that are critical to achieving the desired performance of the apparatus. The secondary mirror may be faceted to permit diffraction-limited optical performance to be achieved for a specific f number of the optical system. The f number of the illustrative system has been deliberately chosen to be much smaller than optimum, to facilitate explanation. In practice, the secondary mirror would be much smaller relative to the primary array diameter, yielding a larger f number, more consistent with the illustration of FIG. 6. The f number of the optical system would be optimized consistent with minimizing the degree of flexure and the moment of inertia of the system, and minimizing the degree of faceting of the secondary mirror.

Figure 5:
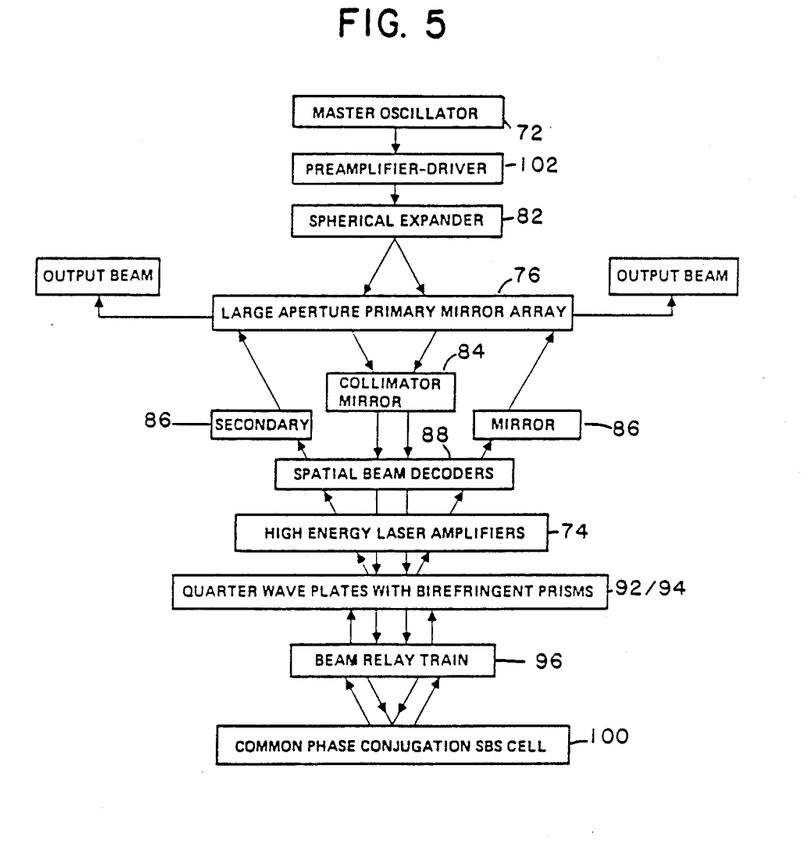
FIG. 5 is a block diagram showing the sequence of steps followed by the apparatus shown in the schematic view of FIG. 4.

FIG. 5 shows in block diagram form the logical progression followed in the optical system of FIG. 4, from the master oscillator to the final output beam. From the master oscillator 72, the reference beam passes through a pre-amplifier driver 102 (not shown in FIG. 4), and then to the spherical expander 82. Light from the expander 82 fills the primary array 76 and is reflected back to the collimating mirror 84. The collimated beams pass through the secondary mirror 86 to what are referred to as the spatial beam decoders, which take the form of the beam divider 88. The separate beams then pass into the power amplifiers 74, then through the wedge 92 and quarter-wave plate 94. Finally, the beams are combined in the beam relay train (the combiner 96) and focused into the phase conjugation cell 100. The return path is shown as being through the beam relay train 96, quarter-wave plates 94, wedges 92, amplifiers 74, and beam decoders 88; then finally to the secondary mirror 86 and the primary mirror array 76, from which the output beam emerges.

Figure 6:
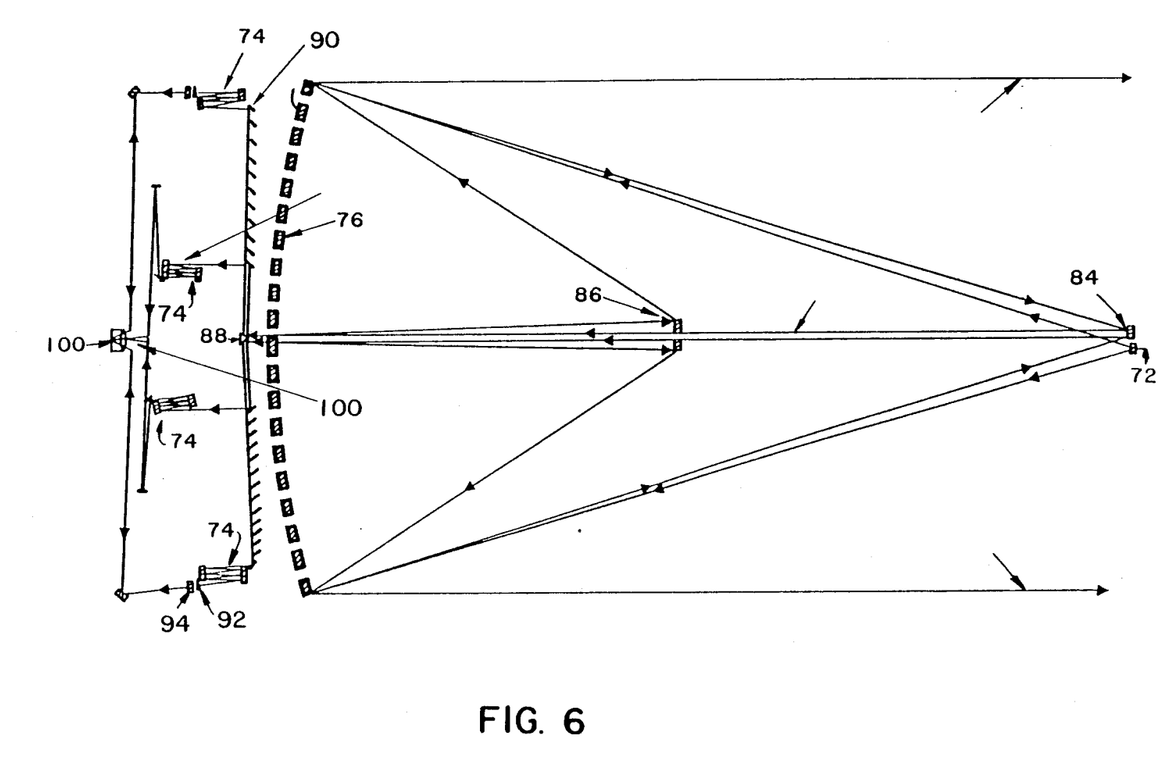
FIG. 6 is schematic view similar to FIG. 4, but showing the primary and secondary mirrors more nearly in their proper scale relationship.

FIG. 6 is similar to FIG. 4, except that its proportions more closely resemble those of a practical embodiment of the invention. Similar reference numerals have been used in the two figures.

Figure 7:
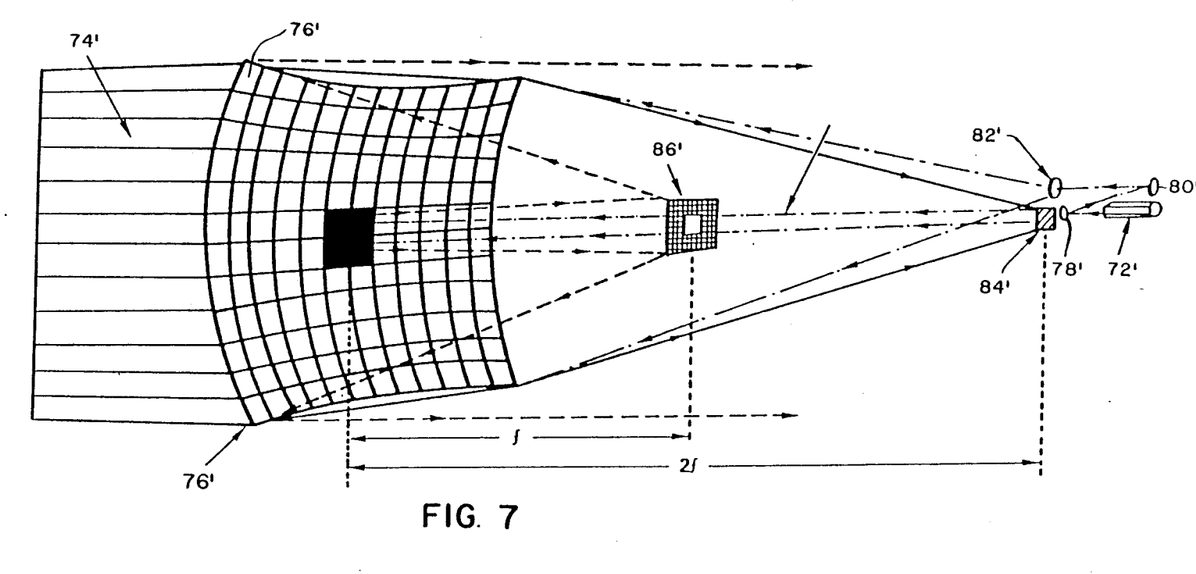
FIG. 7 is an isometric view of a square phased array constructed in accordance with the invention.

For extraordinarily large apertures, in the order of twenty meters, the invention may possibly provide the only technique to achieve diffractionlimited performance in such a large output beam. It is certainly the simplest and least expensive approach. FIG. 7 shows a possible design for a 10×10 array of excimer lasers, where each laser amplifier module measures approximately 2×2 meters, and the primary mirror array 76' measures 20×20 meters. The laser amplifier modules 74' are shown as being arranged in parallel with each other and with the direction of output beam propagation, each module being located behind a primary mirror element. The overall system is, therefore, relatively compact for such a large apparatus, and the transit times between the phase conjugation cell and the amplifiers are minimized as far as possible. Square apertures are advantageous because of their superior packing density. Any undesirable rectangular aperture diffraction effects can be eliminated by the use of narrow apodizing stripes applied to the margins of the mirror apertures.

There are alternative approaches for separating the phase-conjugated reflected beams for out-coupling from the apparatus. For example, a grating can be employed to make use of the frequency shift inherent in the phase conjugation cell. The reflected beams are therefore deflected through a different angle at the grating. Another possibility is to use a quarter-wave plate in the manner described, to effect a ninety-degree rotation of the direction of polarization, and to include a polarization-sensitive reflector to separate out the reflected beam. The reflector is effective to transmit light that is linearly polarized in one direction, but to reflect light polarized in the other direction. Other variations of polarization-sensitive optical elements might also be employed.

It will be appreciated from the foregoing that the present invention represents a significant advance in the field of high-energy lasers. In particular, the invention permits the construction of a phased array of laser sources with relatively inexpensive and presently available components, and yet makes use of the immense power advantage provided by phase coherency among the beams making up the large array. The use of a phase conjugation cell not only ensures phase coherency of the individual beams, but also compensates automatically for all types of phase aberrating errors introduced into the beams in individual amplifiers and their related optical components.

It will also be appreciated that, although various specific embodiments have been described in detail for purposes of illustration, various modifications may be made without departing from the spirit and scope of the invention.

For example, lasers emitting multiple wavelengths, such as hydrogen fluoride lasers and deuterium fluoride lasers, can also benefit from this invention. The master oscillator emits radiation matching the amplifiers, and a dispersive element, such as a grating or prism, is placed in the probe beam, just in front of the phase conjugate cell. The dispersive element causes the different wavelengths to come to a focus at different locations within the phase conjugate cell, thereby eliminating any crosstalk between them. The reflected light is combined by passing back through the same dispersive element, effecting a single return beam.

Various other modifications are possible within the scope of the invention. Accordingly, the invention is not to be limited except as by the appended claims.

We claim:

1. Apparatus for producing a phased array of multiple laser beams, the apparatus comprising:
   a master laser oscillator for producing a reference laser beam that is coherent and diffraction-limited;
   optical means for dividing the reference beam into a plurality of probe beams;
   an equal plurality of laser amplifiers positioned to receive the respective probe beams, each including a laser gain region and optical means to provide multiple passes through the gain region, to produce near saturation flux in the probe beams;

a single phase conjugation cell;

means for focusing the plurality of probe beams into partially overlapping focal volumes within the phase conjugation cell, whereby each probe beam is reflected from the phase conjugation cell along a path substantially identical with that of the corresponding probe beam;

discrimination means associated with each of the probe beams, for discriminating between a probe beam and the corresponding reflected beam, whereby the reflected beams emerging from the laser amplifiers are phase coherent with each other and are free of aberrations resulting from passage through the laser amplifiers and through the means for focusing the probe beams into the phase conjugation cell; and means for coupling the reflected beams emerging from the laser amplifiers out of the apparatus, to produce a set of output beams that are laterally displaced from each other as they leave the apparatus and are dynamically locked together in phase.

2. Apparatus as set forth in claim 1, wherein the discrimination means includes:

polarization-sensitive means, for deflecting the probe beam and the reflected beam through an angle dependent on the direction of polarization; and means for polarizing the probe beams and the reflected beams in different directions;

whereby the reflected beams emerge from the laser amplifiers along paths that are angularly separated from those along which the probe beams entered the amplifiers, and each of the reflected beams can therefore be deflected out of the apparatus as part of the cophasal set of output beams.

3. Apparatus as set forth in claim 2, wherein:

the polarization-sensitive means includes a birefringent wedge; and the means for polarizing the beams differently includes a quarter-wave plate, which changes the direction of linear polarization by ninety degrees as a result of two passes through the plate, one pass being of a probe beam and the other pass being of the corresponding reflected beam.

4. Apparatus as set forth in claim 1, wherein:

each laser amplifier includes two curved mirrors, one of which is convex and the other concave.

5. Apparatus for producing a phased array of multiple laser beams, the apparatus comprising:

a master laser oscillator for producing a reference laser beam that is coherent and diffraction-limited;

means for expanding the reference beams into a divergent beam;

a primary mirror array positioned to receive and reflect the divergent reference beam;

a collimating mirror positioned to receive the reflected divergent reference beam and collimate it into a generally cylindrical bundle of reference beams;

optical means for dividing the bundle of reference beams into a plurality of probe beams;

an equal plurality of laser amplifiers positioned to receive the respective probe beams, each including a laser gain region and optical means to provide multiple passes through the gain region, to produce near saturation flux in the probe beams;

a single phase conjugation cell;

means for focusing the plurality of probe beams into partially overlapping focal volumes within the phase conjugation cell, whereby each probe beam is reflected from the phase conjugation cell along a path substantially identical to that of the corresponding probe beam;

discrimination means associated with each of the probe beams, for discriminating between a probe beam and the corresponding reflected beam, whereby the reflected beams emerging from the laser amplifiers are phase coherent with each other and are free of aberrations resulting from passage through the laser amplifiers, through the means for focusing the probe beams into partially overlapping focal volumes within the phase conjugation cell, and through other portions of the apparatus in which the reflected beams substantially retrace the paths of probe or reference beams; and a secondary mirror positioned to receive the reflected beams and reflect them onto the primary mirror array, to produce a set of phase coherent and aberration-free output beams that are laterally spaced from each other as they emerge from the apparatus.

6. Apparatus as set forth in claim 5, wherein:

the secondary mirror and the primary mirror array each have a central opening to permit passage of the collimated reference beams; and the laser amplifiers are located on the opposite side of the primary mirror array from the secondary mirror and the master oscillator.

7. Apparatus as set forth in claim 6, wherein:

the primary mirror array, the secondary mirror and the apertures therein are all square in shaped to maximize the packing density.

8. Apparatus as set forth in claim 5, wherein the discrimination means includes:

polarization-sensitive means, for deflecting the probe beam and the reflected beam through an angle dependent on the direction of linear polarization; and means for linearly polarizing the probe beams and the reflected beams in different directions;

whereby the reflected beams emerge from the laser amplifiers along the paths that are angularly separated from those along which the probe beams entered the amplifiers, and the reflected beams can therefore be deflected out of the apparatus as part of the set of phase coherent output beams.

9. Apparatus as set forth in claim 8, wherein:

the polarization-sensitive means includes a birefringent wedge; and the means for polarizing the beams differently includes a quarter-wave plate, which changes the direction of linear polarization by ninety degrees as a result of two passes through the plate.

10. Apparatus as set forth in claim 5, wherein:

each amplifier includes two curved mirrors, one of which is convex and the other concave.

11. Apparatus for producing a phased array of laser beams, the apparatus comprising:

a master laser oscillator, for producing a coherent and diffraction-limited reference beam;

means for dividing the reference beam into a plurality of probe beams;

a plurality of laser amplifiers for amplifying the probe beams;

a single phase conjugation cell into which the probe beams are focused into partially overlapping focal volumes within the cell, and from which they are reflected in coherent and phase conjugate form; and means for coupling the reflected beams out of the apparatus after each has retraced the path of the corresponding probe beam through its laser amplifier, to obtain a cophasal set of output beams without phase aberrations, emerging from the apparatus in a laterally spaced relationship.

12. A method for obtaining a phased array of laser beams from apparatus including a plurality of laser amplifiers, the method comprising the steps of:

generating a coherent diffraction-limited reference beam in a master laser oscillator;

dividing the reference beam into a plurality of probe beams;

amplifying each probe beam in a separate laser amplifier;

focusing the amplified probe beams into partially overlapping focal volumes within a single phase conjugation cell;

generating reflected beams in the phase conjugation cell, the reflected beams being in phase with each other and being phase conjugated;

passing the reflected beams back along the paths of the probe beams, thereby compensating for phase aberrations introduced in those paths; and coupling the reflected beams out of the apparatus, for output as a cophasal set or array of laterally spaced beams.

13. A method as set forth in claim 12, wherein the step of coupling the reflected beams out of the apparatus includes:

deflecting the probe beams and the reflected beams by amounts dependent on the direction of linear polarization; and linearly polarizing the probe beams and the reflected beams in different directions.

14. A method as set forth in claim 13, wherein:

the step of deflecting is effected by passing each beams through a birefringent wedge; and the step of linearly polarizing is effected by passing each beam through a quarter-wave plate. which changes the direction of linear polarization by ninety degrees in two passes through the plate.

15. A method as set forth in claim 12, wherein the step of dividing the reference beam into probe beams includes:

expanding the reference beam into a diverging reference beam:

reflecting the diverging reference beam from a primary mirror array;

collimating the reflected reference beam into a bundle of reference beams; and dividing the bundle of reference beams into the plurality of probe beams.

16. The method as set forth in claim 15, and further including the steps of:

reflecting the reflected beams from a secondary mirror back onto the primary mirror array, for reflection as the desired output array of beams wherein each phase-conjugated beam returns to its own primary mirror element to effect compensation of accumulated optical phase errors and piston errors.

* * * * *